(12) United States Patent
Saini et al.

(10) Patent No.: US 10,994,850 B2
(45) Date of Patent: May 4, 2021

(54) ASPIRATORS FOR EVACUATION ASSEMBLIES

(71) Applicant: Goodrich Corporation, Charlotte, NC (US)

(72) Inventors: Mohinder Saini, Karnataka (IN); Hanuman Dushyant Narwade, Maharastra (IN)

(73) Assignee: GOODRICH CORPORATION, Charlotte, NC (US)

( * ) Notice: Subject to any disclaimer, the term of this patent is extended or adjusted under 35 U.S.C. 154(b) by 194 days.

(21) Appl. No.: 16/396,248

(22) Filed: Apr. 26, 2019

(65) Prior Publication Data

US 2020/0231292 A1 Jul. 23, 2020

(30) Foreign Application Priority Data

Jan. 23, 2019 (IN) .............................. 201911002826

(51) Int. Cl.
*B64D 25/14* (2006.01)
*F04F 5/46* (2006.01)
*B63C 9/00* (2006.01)

(52) U.S. Cl.
CPC ................ *B64D 25/14* (2013.01); *F04F 5/46* (2013.01); *B63C 2009/0076* (2013.01)

(58) Field of Classification Search
CPC ... B64D 25/14; B63C 2009/0076; B63C 9/18; F04F 5/466; F04F 5/18; F04F 5/00; Y10S 244/905; B01F 3/02; B01F 5/0281

USPC ........................................... 137/888; 417/196
See application file for complete search history.

(56) References Cited

U.S. PATENT DOCUMENTS

| 4,368,009 | A | * | 1/1983 | Heimovics, Jr. ...... B61B 12/005 |
| | | | | 417/179 |
| 6,004,176 | A | | 12/1999 | Moran |
| 8,322,996 | B2 | | 12/2012 | McNeil et al. |
| 9,863,442 | B2 | | 1/2018 | Ruegsegger et al. |
| 9,956,326 | B2 | | 5/2018 | Ramella et al. |
| 9,993,584 | B2 | | 6/2018 | Mehta et al. |
| 2016/0102682 | A1 | * | 4/2016 | Gass ....................... B22F 5/106 |
| | | | | 417/179 |
| 2017/0327237 | A1 | | 11/2017 | Saini et al. |
| 2018/0112634 | A1 | | 4/2018 | Hoffman et al. |
| 2018/0202466 | A1 | * | 7/2018 | Haynes ................... F04F 5/461 |
| 2018/0265205 | A1 | | 9/2018 | Friedrich et al. |
| 2019/0010962 | A1 | * | 1/2019 | White .................... B64D 25/14 |

* cited by examiner

*Primary Examiner* — Timothy P. Kelly
(74) *Attorney, Agent, or Firm* — Cantor Colburn LLP (57) ABSTRACT

An aspirator includes a duct having a wall with a surface bounding a converging portion and a diverging portion of the duct. The converging portion of the duct has an inlet and the diverging portion of the duct has an outlet, the inlet being in fluid communication with the outlet through the converging portion and the diverging portion of the duct. The surface of the duct wall includes a conformal surface portion extending between the inlet of the duct and the outlet of the duct that is conformal with an aspirator seat surface portion of a support structure to conform the duct to the support structure. Evacuation assemblies are also described.

19 Claims, 6 Drawing Sheets

ASPIRATORS FOR EVACUATION ASSEMBLIES

CROSS REFERENCE TO RELATED APPLICATIONS

This application claims the benefit of Indian Application No. 201911002826, filed Jan. 23, 2019, which is incorporated by reference in its entirety herein.

BACKGROUND

The present disclosure relates to vehicle evacuation assemblies, and more particularly to aspirators for inflating evacuation devices such as on aircraft.

Aircraft emergency evacuation systems commonly contain inflatable rescue apparatuses to aid in an emergency evacuation of an aircraft. For example, the inflatable rescue apparatus may be a slide suitable for assisting occupants in descending from a floor-level aircraft exit or from an aircraft wing. In another example, the inflatable rescue apparatus may be a life raft suitable for floating on water and carrying passengers following a water landing. The aircraft inflatable rescue apparatus may be packed on a packboard, which attaches to an aircraft door or in the fuselage. Commonly, the inflatable rescue apparatus is packed (i.e. folded) in the available space over and around an aspirator positioned on the packboard. Packing the inflatable rescue apparatus in the available space over and around the aspirator can be challenging and may require extensive labor.

Such aspirators and evacuation assemblies are generally acceptable for their intended purpose. However, there remains a need for improved aspirators and evacuation assemblies. The present disclosure provides a solution to this need.

BRIEF SUMMARY

According to one embodiment, an aspirator is provided. The aspirator includes a duct having a wall with a surface bounding converging and diverging portions of the duct. The converging portion of the duct has an inlet and the diverging portion of the duct has an outlet, the inlet being in fluid communication with the outlet through the converging portion and the diverging portion of the duct. The surface of the wall includes a wherein the surface of the wall includes a conformal surface portion extending between the inlet and the outlet that is conformal with an aspirator seat surface portion of a support structure to conform the duct to the support structure.

In addition to one or more of the features described above, or as an alternative, further embodiments may include wherein the conformal surface portion of the duct is substantially planar between the inlet of the duct and the outlet of the duct.

In addition to one or more of the features described above, or as an alternative, further embodiments may include wherein at least one of the duct inlet, the duct outlet, and a throat of the duct define a flow area with a non-circular shape.

In addition to one or more of the features described above, or as an alternative, further embodiments may include wherein each of the duct inlet, the duct outlet duct, and a throat of the duct defines a flow area with a non-circular shape.

In addition to one or more of the features described above, or as an alternative, further embodiments may include wherein the inlet of the duct defines a flow area bounded by a plurality of linear segments.

In addition to one or more of the features described above, or as an alternative, further embodiments may include wherein one of the plurality of linear segments is oblique relative to another of the plurality of linear segments.

In addition to one or more of the features described above, or as an alternative, further embodiments may include wherein one of the plurality of linear segments is parallel relative to another of the plurality of linear segments.

In addition to one or more of the features described above, or as an alternative, further embodiments may include wherein one of the plurality of linear segments is connected to another of the plurality of linear segments by an arcuate segment.

In addition to one or more of the features described above, or as an alternative, further embodiments may include wherein each of the duct inlet, the duct outlet, and a throat of the duct define a flow area a flow area bounded by a plurality of linear segments, wherein one of the plurality of linear segments is oblique relative to another of the plurality of linear segments, wherein one of the plurality of linear segments is parallel relative to a another of the plurality of linear segments.

In addition to one or more of the features described above, or as an alternative, further embodiments may include wherein the duct defines a throat with a flow area between the inlet and the outlet of the duct.

In addition to one or more of the features described above, or as an alternative, further embodiments may include wherein the throat has a flow area that is smaller than a flow area of the inlet, wherein the throat has a flow area that is smaller than a flow area of the outlet.

In addition to one or more of the features described above, or as an alternative, further embodiments may include wherein the throat has a flow area bounded by a plurality of linear segments, one of the plurality of linear segments is oblique relative to another of the plurality of linear segments, wherein one of the plurality of linear segments is parallel relative to another of the plurality of linear segments, wherein one of the plurality of linear segments is connected to a another of the plurality of linear segments by an arcuate segment.

In addition to one or more of the features described above, or as an alternative, further embodiments may include wherein nozzles of the nozzle array are distributed in a plurality of rows, wherein one of the rows has fewer nozzles than another of the rows.

In addition to one or more of the features described above, or as an alternative, further embodiments may include wherein nozzles array includes nineteen (19) nozzles.

In addition to one or more of the features described above, or as an alternative, further embodiments may include wherein the duct has a minor dimension that provides more than about 4.7 inches (about 11.9 centimeters) of headroom between the duct and an enclosure for an evacuation assembly enclosing the duct.

According to another embodiment, an evacuation assembly is provided. The evacuation assembly includes an aspirator as described above and a support structure supporting the aspirator. An inflatable evacuation slide overlays the support structure such that the aspirator is disposed between the inflatable evacuation side and the aspirator. An enclosure with an interior is seated on the support structure, and the aspirator and the inflatable evacuation slide are arranged within the interior of the enclosure.

In addition to one or more of the features described above, or as an alternative, further embodiments may include a nozzle array having a plurality of nozzles arranged within the converging portion of the duct, the plurality of nozzles may be distributed in a plurality of rows, one of the rows may have fewer outlets than another of the outlets, one of the rows may have the same number of outlets as another of the rows, and a pressurized gas source can be supported by the support structure located outside the duct and in fluid communication with the outlets of the nozzle.

In addition to one or more of the features described above, or as an alternative, further embodiments may include wherein the conformal surface portion of the duct is substantially planar between the inlet of the duct and the outlet of the duct, and wherein each of the duct inlet, the duct outlet duct and a throat of the duct defines a flow area with a non-circular shape.

Technical effects of embodiments of the present disclosure include aspirators requiring less space than aspirators having a cylindrical geometry for a common inflation requirement. In certain embodiments packing of the evacuation slide within the evacuation assembly is simplified as a relatively large volume is provided for the evacuation slide in relation to an aspirator having a cylindrical geometry for a given inflation requirement. It is also contemplated that the expected service life of the evacuation assembly can be increased due to the relatively small internal loads resultant from the packing process in relation to evacuation assemblies having aspirators with a cylindrical shape.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of an aspirator in accordance with the disclosure is shown in FIG. 2 and is designated generally by reference character 100. Other embodiments of aspirators and evacuation assemblies employing aspirators in accordance with the present disclosure or aspects thereof, are provided in FIGS. 1 and 3-7, as will be described. The aspirators and evacuation assemblies described herein can be used in inflatable evacuation systems for vehicles, such as inflatable slides and life rafts on ships and aircraft, though the present disclosure is not limited to any particular type of inflatable device or to ships and aircraft in general.

Figure 1:
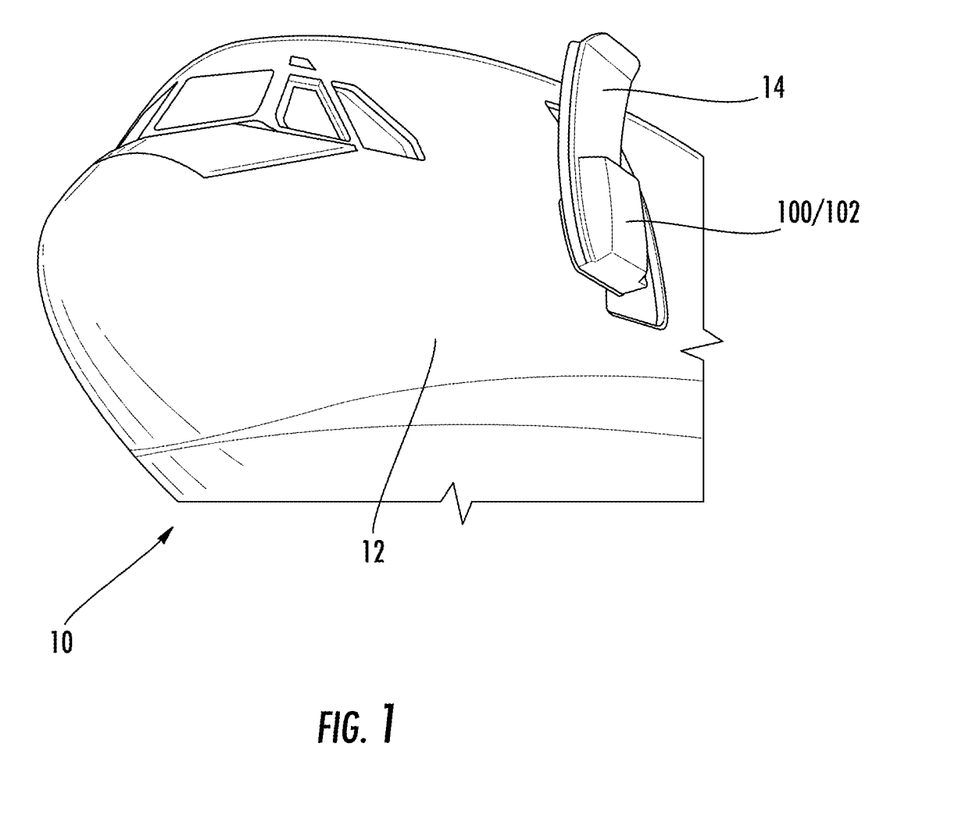
FIG. 1 is a side elevation view of an aircraft including an evacuation assembly with an aspirator, schematically showing the evacuation assembly and the aspirator associated with a door to the aircraft cabin.
Figure 2:
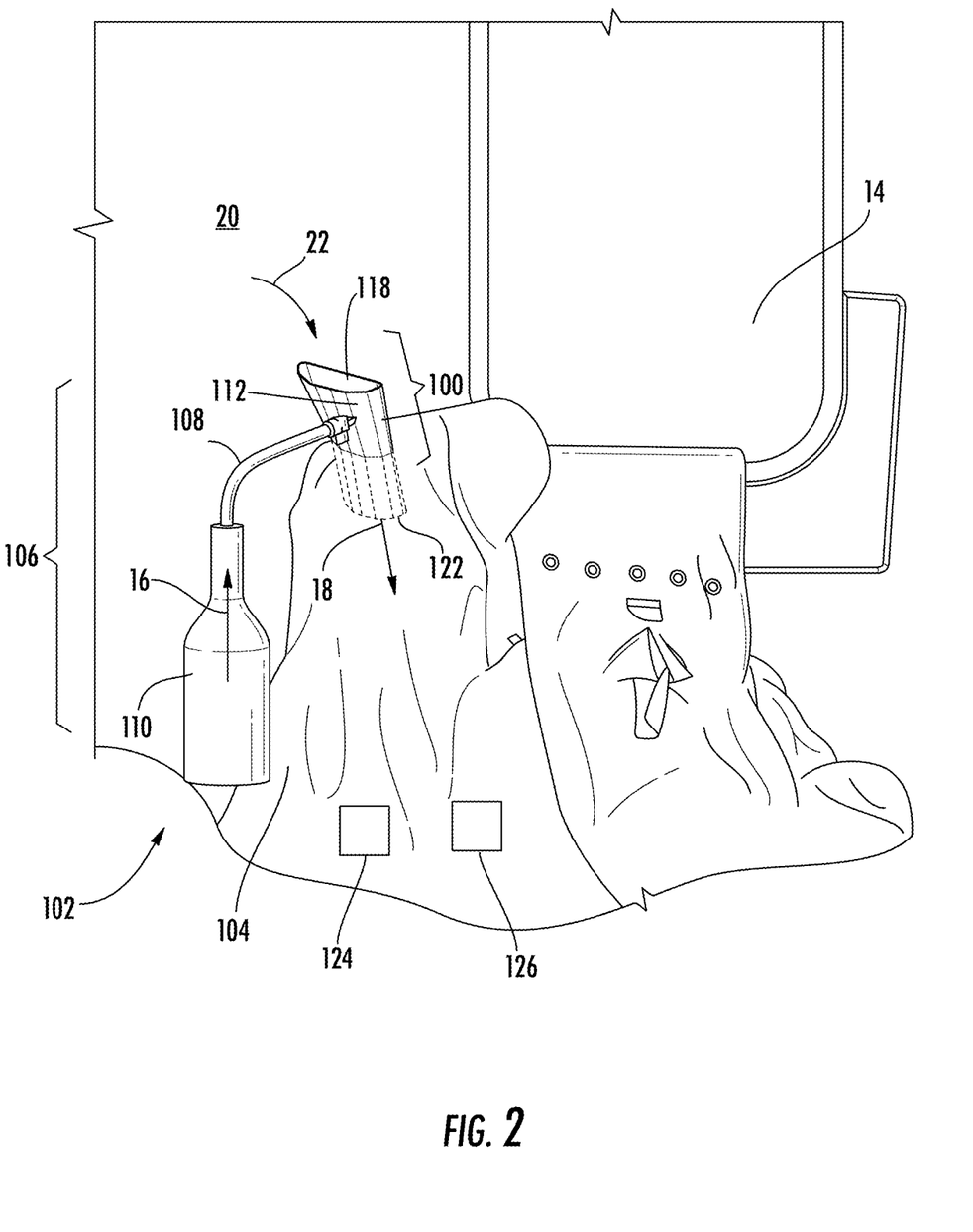
FIG. 2 is side elevation view of the evacuation assembly and the aspirator illustrated in FIG. 1, showing the aspirator connecting a compressed gas source to an inflatable body.

Referring to FIG. 1, an aircraft 10 is shown. Aircraft 10 includes a fuselage 12 with a passenger and crew cabin located within the fuselage 12 and a door 14. An evacuation assembly 102 including the aspirator 100 aspirator is carried by the aircraft 10 and is positioned in proximity to the door 14, usually on the inside of the door or within the aircraft fuselage behind a cover, to provide egress of passengers and/or crew from the aircraft 10. In certain embodiments the evacuation assembly 102 can be deployed and inflated to provide an egress slide-type evacuation assembly in the event that a stair structure or a jetway is unavailable to facilitate egress of passengers and/or crew from the aircraft 10. In accordance with certain embodiments it is contemplated that the evacuation assembly 102 can be deployed and inflated to provide a life raft-type flotation device. Although shown in FIG. 1 and described herein in the context of an aircraft evacuation assembly, those of skill in the art will appreciate that other types of evacuation assemblies and inflatable bodies can also benefit from the present disclosure.

With reference to FIG. 2, the evacuation assembly 102 is shown. The evacuation assembly 102 is fixed to the door 14 and includes the aspirator 100, an inflatable body 104 and a pressurized gas source 106. The pressurized gas source 106 is in fluid communication with aspirator 100 through a conduit 108 and is configured and adapted to provide a primary gas flow 16 to the aspirator 100. In the illustrated embodiment the pressurized gas source 106 includes a gas cylinder 110. In certain embodiments the primary gas flow 16 provided by the pressurized gas source 106 upon actuation of the evacuation assembly 102 comprises a mixture of nitrogen and carbon dioxide, such as from a charge of compressed air retained within a gas cylinder.

The aspirator 100 is an ejection pump-type device and is configured and adapted to generate an inflation gas flow 18 suitable for inflating the inflatable body 104. In this respect the aspirator 100 includes a duct 112 and a nozzle array 114 (shown in FIG. 5). The nozzle array 114 of FIG. 5 is located within the interior of the duct 112 and is in fluid communication with the pressurized gas source 106 to receive therefrom the primary gas flow 16. The duct 112 includes a converging portion 116 (shown in FIG. 4) with an inlet 118 that is connected to a diverging portion 120 (shown in FIG. 4) with an outlet 122 (shown in FIG. 5). The inlet 118 is open to the external environment 20 such that issue of the primary gas flow 16 into the duct 112 within the converging portion 116 of the duct 112 causes a secondary gas flow 22 to enter the inlet 118 of the duct 112 and intermix with the primary gas flow 16 to form the inflation gas flow 18.

The inflatable body 104 is in fluid communication with the outlet 122 of the duct 112 to receive therefrom the inflation gas flow 18. The inflation gas flow 18 is adapted to inflate the inflatable body 104 to serve the intended function of the evacuation assembly 102. In certain embodiment the inflatable body 104 includes an evacuation slide 124 that is configured and adapted to span a distance between the ground and the door 14, thereby providing an avenue for egress for passengers and/or crew of the aircraft 10 (shown in FIG. 1). In accordance with certain embodiments the inflatable body 104 includes an inflatable life raft 126, the inflatable body thereby providing flotation of passengers and/or crew of the aircraft 10 subsequent from egress from the aircraft 10. As will be appreciated by those of skill in the art in view of the present disclosure, the examples of inflatable bodies identified in the present disclosure are for illustration purposes and are non-limiting, and that other types of inflatable bodies can also benefit from the present disclosure.

As will be appreciated by those of skill in the art in view of the present disclosure, it can be advantageous to limit the size of the evacuation assembly 102 while providing the functionality necessary to inflate the inflatable body 104 upon activation of the evacuation assembly. For example, one approach to constructing the evacuation assembly 102 is to construct the duct 112 with a circular flow area. Employment of a circular flow area simplifies the computational requirements of fluid flow through the duct 112 and can facilitate certification and qualification of the evacuation assembly 102.

While generally acceptable for their intended purpose, forming aspirators with a circular flow area can make more difficult use of the space allocated to the inflatable body 104 as the inflatable body 104 must be manipulated to occupy the space between support structure 128 and the duct 112 and the gas source 106, respectively. For example, it can be necessary apply pressure and/or manipulate the inflatable body 104 during packing to utilize the space between the duct and the gas source. Embodiments herein are directed to forming duct 112 with a non-circular flow area, and more particularly with a flow area conformal with the underlying support structure 128, the aspirator 100 can both provide suitable a inflation gas flow and require less space than were the duct 112 constructed with a circular flow area. In certain embodiments the duct 112 can be constructed with a conformal shape and provide an inflation gas flow, e.g., inflation gas flow 18, that is equivalent to certified evacuation assemblies that require less space, requires lower packing pressure, and/or allow for the incorporation of added components within the evacuation assembly 102 within the installation envelop typically allocated to evacuation assemblies on vehicles like aircraft.

Figure 3:
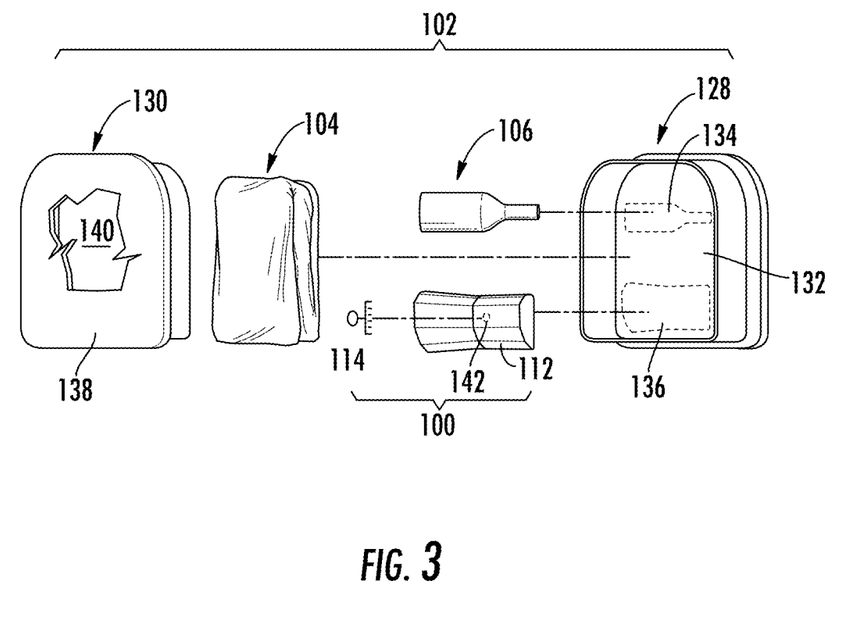
FIG. 3 is an exploded view of the evacuation assembly of FIG. 1, showing the aspirator with a conformal surface portion disposed between the inflatable body and a support structure.

With reference to FIG. 3, the evacuation assembly 102 is shown. The evacuation assembly 102 includes the pressurized gas source 106, the inflatable body 104 and the aspirator 100. The evacuation assembly 102 also includes the support structure 128 and an enclosure 130.

The support structure 128 is configured and adapted to support the aspirator 100 and the pressurized gas source 106. In this respect the support structure 128 includes a closure body 132 with a pressurized gas source seat portion 134 and an aspirator seat portion 136. The aspirator seat portion 136 and the pressurized gas source seat portion 134 are each located on a common side of the support structure 128 and are configured and adapted to receive therein the pressurized gas source 106 and the aspirator 100, which seats therein the nozzle array 114. Support may be provided, for example, by respective fastener and/or brackets. Alternatively and/or additionally, support may also be provided by a slot and/or key arrangement. In certain embodiments the support structure 128 is configured with fit and form consistent with an existing packboard, allowing the evacuation assembly 102 to serve as a replacement evacuation assembly (or upgrade) to an existing aircraft.

The enclosure 130 includes an enclosure body 138 configured and adapted to receive the closure body 132 and has an interior 140. The interior 140 has a volume sized to receive therein the inflatable body 104, the pressurized gas source 106 and the aspirator 100. It is contemplated that the inflatable body 104 seat between the closure body 132 and the enclosure body 138, the inflatable body 104 overlapping the aspirator 100 such that the aspirator 100 is disposed between the inflatable body 104 and the aspirator seat portion 136 of the support structure 128. In this respect the duct 112 has a conformal surface portion 142 that is conformal with the aspirator seat portion 136 of the support structure 128 to limit space occupied by the duct 112 when coupled to the support structure 128.

Figure 4:
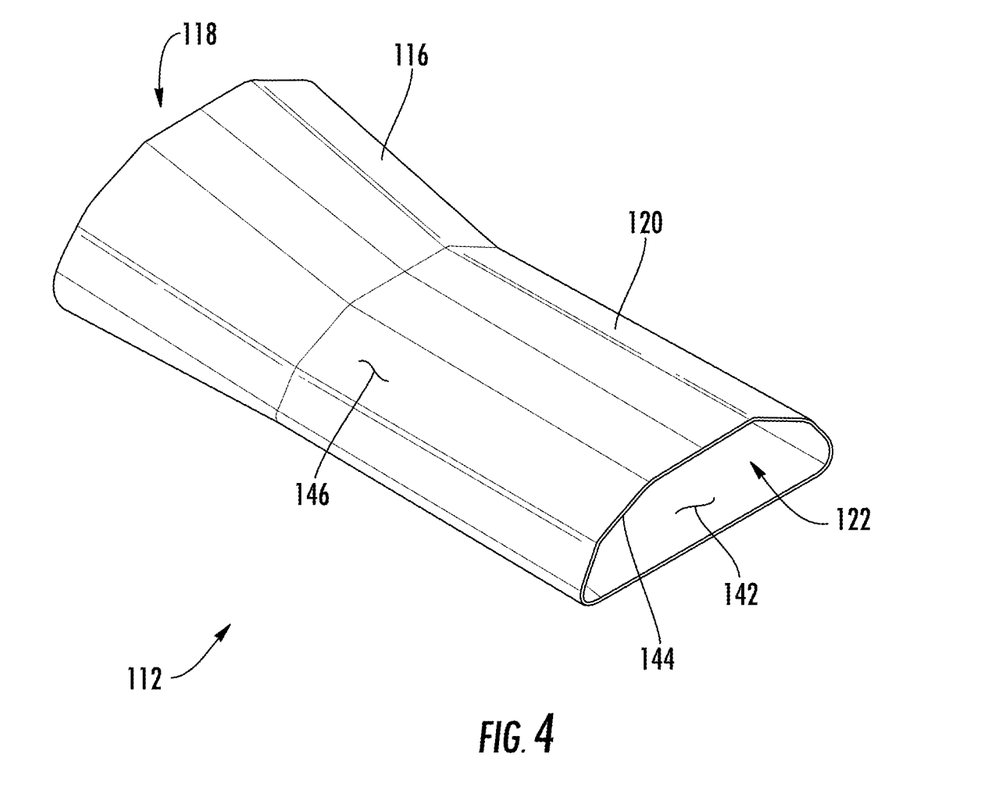
FIG. 4 is a perspective view of the aspirator of the evacuation assembly of FIG. 1, showing the conformal surface portion and flow areas defined by the inlet, opposed outlet, and throat of the aspirator duct.
Figure 5:
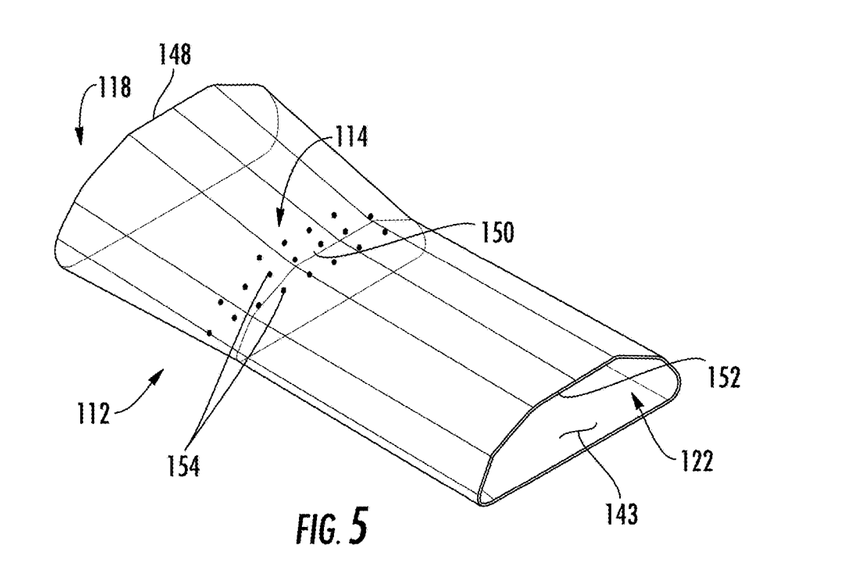
FIG. 5 is a phantom view of the aspirator of the evacuation assembly of FIG. 1, showing a nozzle array arranged within a converging portion of the duct and at a location upstream of the throat of the aspirator duct.

With reference to FIG. 4, the duct 112 is shown. The duct 112 has a wall 144 with a surface 146 bounding the converging portion 116 of the duct 112 and the diverging portion 120 of the duct 112. The converging portion 116 of the duct 112 has the inlet 118 and the diverging portion 120 of the duct 112 has the outlet 122, the inlet 118 being in fluid communication with the outlet 122 through the converging portion 116 and the diverging portion 120 of the duct 112. The surface 146 duct wall 144 includes the conformal surface portion 142, which extends between the inlet 118 and the outlet 122 of the duct and which is conformal with the aspirator seat portion 136 to limit space occupied by the duct 112 when supported by the support structure 128 (shown in FIG. 3).

With reference to FIG. 5, the duct 112 and nozzle array 114 are shown. The duct 112 is non-circular along its longitudinal length. In this respect the duct 112 has an inlet flow area 148, a throat flow area 150, and an outlet flow area 152—each of which define a flow area with a non-circular shape. The inlet flow area 148 is located upstream of the throat flow area 150 and forms the inlet 118 of the duct 112. The outlet flow area 152 is located downstream of the throat flow area 152 and forms the outlet 122 of the duct 112. The throat flow area 150 is located between the inlet 118 and the outlet 122, defines the smallest flow area through the duct 112, and demarcates the location where the converging portion 116 of the duct 112 joins the diverging portion 120 of the duct 112.

The nozzle array 114 is located axially between the inlet 118 and the throat flow area 150 and is fluid communication with the pressurized gas source 106 (shown in FIG. 1) for introducing the primary gas flow 16 into the duct 112. As shown in FIG. 5 the duct has a substantially planar surface 143 that extends the longitudinal length of the duct 112 between the inlet 118 and the outlet 122. This allows the duct 112 to be supported along its length by the support structure 128 without defining a significant overhang volume into which the inflatable body 104 need be inserted (or the volume left unoccupied) during packing. As also shown in FIG. 5 the nozzle array 114 includes nineteen (19) nozzles 154, which allows matching flow uniformity at the outlet 122 with an aspirator having an outlet with a circular flow area while accommodating the major and minor dimensions of the flow area defined by the outlet 122. As will be appreciated by those of skill in the art in view of the present disclosure, aspirators having fewer than nineteen (19) nozzles or more than nineteen (19) nozzles can also benefit from the present disclosure.

Figure 6:
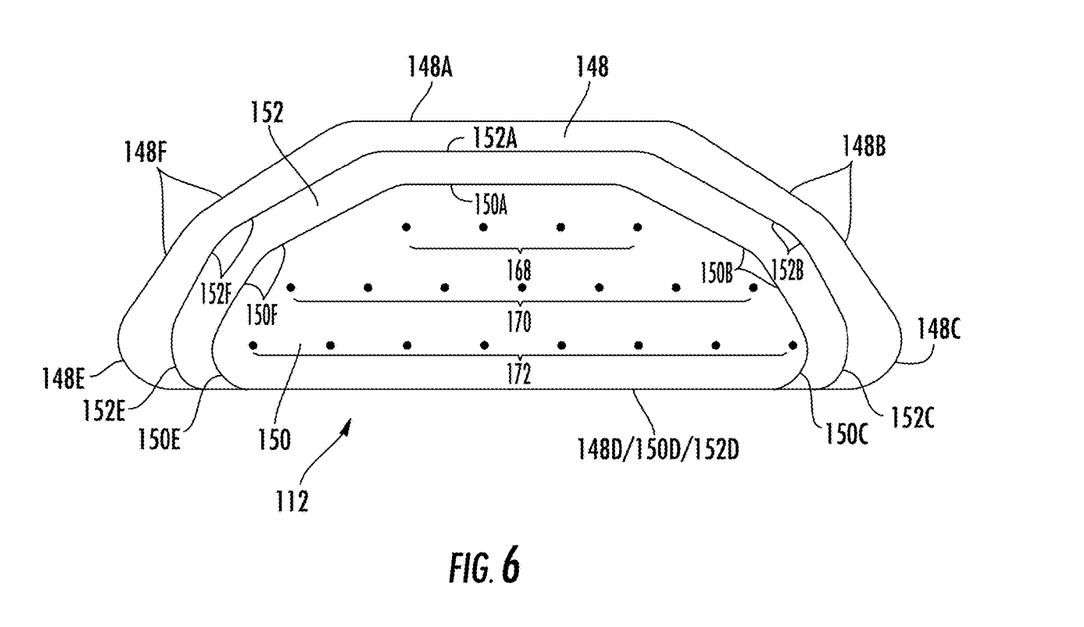
FIG. 6 is an axial end view of the aspirator of the evacuation assembly of FIG. 1, showing the outlet flow area, the throat flow area, and the inlet flow area of the duct of the aspirator.

With reference to FIG. 6, the inlet flow area 148, the throat flow area 150, and the outlet flow area 152 are shown. The inlet flow area 148 is larger than the flow area 152 of the outlet 122 and is bounded by segments 148A-148F. An upper segment 148A (relative to the top of FIG. 6) extends in parallel with a lower segment 148D. Two oblique segments 148B and an arcuate segment 148C connect the upper segment 148A to the lower segment 148D on the right-hand side of the inlet flow area 148. Two oblique segments 148F and an arcuate segment 148E connect the upper segment 148A to the lower segment 148D on the left-hand side of the inlet let flow area 148.

The outlet flow area 152 is larger than the throat flow area 150, is similar in shape to the inlet flow area 148, and is bounded by segments 152A-152F. An upper segment 152A extends in parallel with a lower segment 152D. Two oblique segments 152B and an arcuate segment 152C connect the upper segment 152A to the lower segment 152D on the right-hand side of the outlet flow area 152. Two oblique segments 152F and an arcuate segment 152E connect the upper segment 152A to the lower segment 152D on the left-hand side of the outlet flow area 148. Notably, the arcuate shape defined at the lower right-hand side and lower left-hand sides of the duct 112 by arcuate segments 148E, 152E, 148C, 152C extend continuously along the longitudinal length of the duct 112 in the illustrated embodiment. This limits the disruption otherwise presented at these locations and allows the duct 112 to provide laminar flow about the entirety of its flow area and similar to ducts having a circular flow area.

The throat flow area 150 is smaller than the outlet flow area 122, is similar in shape to the outlet flow area 152, and is bounded by segments 150A-150F. An upper segment 150A of the throat flow area 150 extends in parallel with a lower segment 152D. Two oblique segments 150B and an arcuate segment 150C of the throat flow area 150 in turn connect the upper segment 150A to the lower segment 150D on the right-hand side of the outlet flow area 150. Further, two oblique segments 150F and an arcuate segment 150E connect the upper segment 150A to the lower segment 150D on the left-hand side of the outlet flow area 148. Notably, the lower segment 150D of the throat flow area 150 extends in parallel with the lower segment 152D of the outlet flow area 152 and the lower segment 148D of the outlet flow area 148, each within a common plane. This defines the planar surface 143 (shown in FIG. 5) and limits wasted space in evacuation assemblies employing packing boards with planar surfaces.

Referring to FIGS. 5 and 6, the nozzle array 114 is arranged within the converging portion of the duct 112. In the illustrated embodiment the nozzles 154 of the nozzle array 114 are distributed into a plurality of rows, a first row 168 of the plurality of rows having fewer nozzles 154 than a second row 170 and the second row having fewer nozzles 154 than a third row 172 of the plurality of rows. Distributing the nozzles 154 such that one row has fewer nozzles than another of the rows allows for limiting flow velocity uniformity at the axial location (relative to flow through the duct 112) where the nozzles are placed, e.g., by spacing outlets of each nozzle at equivalent spacing distances between each adjacent nozzle and the interior surface of the duct 112.

Figure 7:
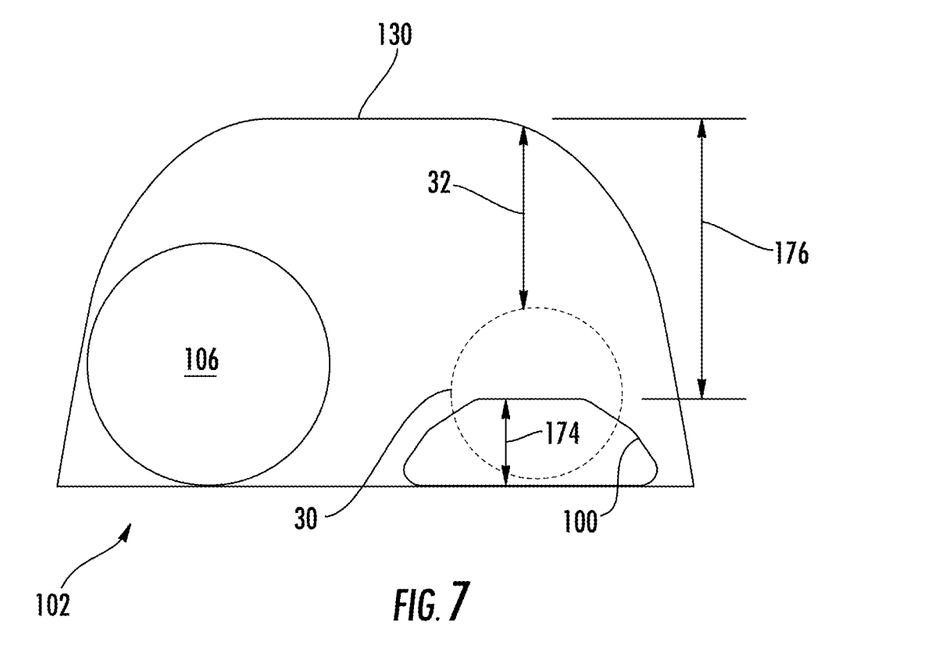
FIG. 7 is a schematic view of the evacuation assembly of FIG. 1, showing headspace provided within the evacuation assembly enclosure for placement of the inflatable body with the aspirator of FIG. 1 in comparison to an aspirator having a circular flow area.

With reference to FIG. 7, the evacuation assembly 102 is shown in a cross-section to show the improved volumetric efficiency of the aspirator 100 in relation to an aspirator 30 having a circular shape and substantially equivalent inflation performance. As shown in FIG. 7, the aspirator 30 has a diameter that provides a headspace dimension 32 of about 4.7 inches (about 11.9 centimeters) within the enclosure 130 for packing the inflatable body 104 (shown in FIG. 2) within the enclosure 130. In contrast, the aspirator 100 has a minor dimension 174 that provides a headspace greater 176 than about 4.7 inches (about 11.9 centimeters), defined between upper segment 156A (shown in FIG. 6) of the inlet flow area 148 (shown in FIG. 6) and the interior surface of the enclosure 130, which allows the aspirator to be used to upgrade or repack existing evacuation assemblies with relatively low packing pressures and/or without the requirement to apply vacuum to the inflatable body 104 during packing, potentially increasing the expected service of the evacuation assembly 102. In certain embodiments the aspirator 100 provides a headspace of about 7.5 inches (about 19.1 centimeters), providing additional space for prognostic sensors and/or batteries, such as for monitoring the readiness of the evacuation assembly 102 for deployment.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aspirator, comprising:
   a duct having a wall with a surface bounding converging and diverging portions of the duct;
   wherein the converging portion of the duct has an inlet and the diverging portion of the duct has an outlet, the inlet in fluid communication with the outlet through the converging portion and the diverging portion of the duct;
   wherein the surface of the wall includes a conformal surface portion extending between the inlet of the duct and the outlet of the duct that is conformal with an aspirator seat surface portion of a support structure to conform the duct to the support structure; and wherein the conformal surface portion of the duct is substantially planar between the inlet of the duct and the outlet of the duct.

2. The aspirator as recited in claim 1, wherein at least one of the duct inlet, the duct outlet, and a throat of the duct define a flow area with a non-circular shape.

3. The aspirator as recited in claim 1, wherein each of the duct inlet, the duct outlet, and a throat of the duct defines a flow area with a non-circular shape.

4. The aspirator as recited is claim 1, wherein the inlet of the duct defines a flow area bounded by a plurality of linear segments.

5. The aspirator as recited in claim 4, wherein one of the plurality of linear segments is oblique relative to another of the plurality of linear segments.

6. The aspirator as recited in claim 4, wherein one of the plurality of linear segments is parallel relative to another of the plurality of linear segments.

7. The aspirator as recited in claim 4, wherein one of the plurality of linear segments is connected to another of the plurality of linear segments by an arcuate segment.

8. The aspirator as recited in claim 1, wherein each of the duct inlet, the duct outlet, and a throat of the duct define a flow area bounded by a plurality of linear segments, wherein one of the plurality of linear segments is oblique relative to another of the plurality of linear segments, wherein one of the plurality of linear segments is parallel relative to another of the plurality of linear segments.

9. The aspirator as recited in claim 1, wherein the duct defines a throat with a flow area between the inlet and the outlet of the duct.

10. The aspirator as recited in claim 9, wherein the flow area of the throat is smaller than a flow area of the inlet, wherein the flow area of the throat is smaller than a flow area of the outlet.

11. The aspirator as recited in claim 9, wherein the throat has a flow area bounded by a plurality of linear segments, one of the plurality of linear segments is oblique relative to another of the plurality of linear segments, wherein one of the plurality of linear segments is parallel relative to another of the plurality of linear segments, wherein one of the plurality of linear segments is connected to another of the plurality of linear segments by an arcuate segment.

12. The aspirator as recited in claim 1, further comprising a nozzle array arranged within the converging portion of the duct.

13. The aspirator as recited in claim 12, wherein nozzles of the nozzle array are distributed in a plurality of rows, wherein one of the rows has fewer nozzles than another of the rows.

14. The aspirator as recited in claim 12, wherein nozzles array includes nineteen (19) nozzles.

15. The aspirator as recited in claim 1, wherein the duct has a minor dimension that provides more than about 4.7 inches (about 11.9 centimeters) of headroom between the duct and an enclosure for an evacuation assembly enclosing the duct.

16. The aspirator as recited in claim 1, wherein the duct has a minor dimension that provides about 7.5 inches (about 19.1 centimeters) of headroom between the duct and an enclosure for an evacuation assembly enclosing the duct.

17. An evacuation assembly, comprising:
an aspirator as recited in claim 1;
the support structure supporting the aspirator;
an inflatable evacuation slide overlaying the support structure with the aspirator disposed between the inflatable evacuation side and the aspirator; and
an enclosure with an interior seated on the support structure, wherein the aspirator and the inflatable evacuation slide are arranged within the interior of the enclosure.

18. An evacuation assembly as recited in claim 17, further comprising:
a nozzle array having a plurality of nozzles arranged within the converging portion of the duct;
wherein the plurality of nozzles are distributed in a plurality of rows, wherein one of the rows has fewer nozzles than another of the rows;
wherein one of the rows has the same number of nozzles as another of the rows; and
a pressurized gas source supported by the support structure located outside the duct and in fluid communication with the nozzle array.

19. An evacuation assembly as recited in claim 18, wherein each of the duct inlet, the duct outlet duct and a throat of the duct defines a flow area with a non-circular shape.

* * * * *